(12) United States Patent
Wang et al.

(10) Patent No.: US 10,756,330 B2
(45) Date of Patent: Aug. 25, 2020

(54) POROUS SILICON NANOSTRUCTURED ELECTRODE AND METHOD

(71) Applicant: The Regents of the University of California, Oakland, CA (US)

(72) Inventors: Wei Wang, Newport Beach, CA (US); Cengiz S Ozkan, San Diego, CA (US); Mihrimah Ozkan, San Diego, CA (US)

(73) Assignee: THE REGENTS OF THE UNIVERSITY OF CALIFORNIA, Oakland, CA (US)

(*) Notice: Subject to any disclaimer, the term of this patent is extended or adjusted under 35 U.S.C. 154(b) by 511 days.

(21) Appl. No.: 15/320,688

(22) PCT Filed: Jun. 19, 2015

(86) PCT No.: PCT/US2015/036726
§ 371 (c)(1),
(2) Date: Dec. 20, 2016

(87) PCT Pub. No.: WO2015/196092
PCT Pub. Date: Dec. 23, 2015

(65) Prior Publication Data
US 2017/0194632 A1 Jul. 6, 2017

Related U.S. Application Data

(60) Provisional application No. 62/113,924, filed on Feb. 9, 2015, provisional application No. 62/015,090, filed on Jun. 20, 2014.

(51) Int. Cl.
H01M 4/134 (2010.01)
H01M 4/04 (2006.01)
(Continued)

(52) U.S. Cl.
CPC .......... *H01M 4/134* (2013.01); *H01M 4/049* (2013.01); *H01M 4/0471* (2013.01);
(Continued)

(58) Field of Classification Search
CPC .... H01M 4/134; H01M 4/1395; H01M 4/049; H01M 4/0471; H01M 4/364;
(Continued)

(56) References Cited

U.S. PATENT DOCUMENTS

2009/0010833 A1  1/2009  Rosenband et al.
2009/0186267 A1* 7/2009  Tiegs ............... B82Y 30/00
                                                    429/129

(Continued)

FOREIGN PATENT DOCUMENTS

CN    101993086 A    3/2011
CN    103427073 A    12/2013
(Continued)

OTHER PUBLICATIONS

"Chinese Application Serial No. 201580044278.1, Office Action dated Aug. 23, 2018", w/English translation, 15 pgs.
(Continued)

Primary Examiner — Osei K Amponsah
(74) Attorney, Agent, or Firm — Schwegman Lundberg & Woessner, P.A.

(57) ABSTRACT

A silicon based micro-structured material and methods are shown. In one example, the silicon based micro-structured material is used as an electrode in a battery, such as a lithium ion battery. A battery, comprising: a first electrode, including a number of porous silicon spheres; a second electrode; and an electrolyte in contact with both the first electrode and the second electrode.

7 Claims, 14 Drawing Sheets

(51) Int. Cl.
  *H01M 4/36* (2006.01)
  *H01M 4/587* (2010.01)
  *H01M 4/62* (2006.01)
  *H01M 4/1395* (2010.01)
  *H01M 4/38* (2006.01)
  *H01M 10/0569* (2010.01)
  *H01M 10/0525* (2010.01)
  *H01M 10/0568* (2010.01)
  *H01M 10/052* (2010.01)
  *H01M 4/02* (2006.01)

(52) U.S. Cl.
  CPC ......... *H01M 4/1395* (2013.01); *H01M 4/364* (2013.01); *H01M 4/382* (2013.01); *H01M 4/386* (2013.01); *H01M 4/587* (2013.01); *H01M 4/621* (2013.01); *H01M 4/625* (2013.01); *H01M 10/052* (2013.01); *H01M 10/0525* (2013.01); *H01M 10/0568* (2013.01); *H01M 10/0569* (2013.01); *H01M 2004/021* (2013.01); *H01M 2004/027* (2013.01); *H01M 2004/028* (2013.01); *H01M 2300/0037* (2013.01); *Y02T 10/7011* (2013.01)

(58) Field of Classification Search
  CPC ...... H01M 4/386; H01M 4/382; H01M 4/587; H01M 4/625; H01M 4/621; H01M 10/0525; H01M 10/0568; H01M 10/0569
  See application file for complete search history.

(56) References Cited

U.S. PATENT DOCUMENTS

| | | | | |
|---|---|---|---|---|
| 2010/0323244 | A1* | 12/2010 | Chiang | H01B 1/122 429/220 |
| 2013/0078508 | A1* | 3/2013 | Tolbert | H01M 4/134 429/188 |
| 2014/0079930 | A1 | 3/2014 | Canham et al. | |

FOREIGN PATENT DOCUMENTS

| | | |
|---|---|---|
| CN | 103531760 A | 1/2014 |
| CN | 106575747 A | 4/2017 |
| EP | 3158600 B1 | 2/2019 |
| GB | 2502625 A | 12/2013 |
| JP | 2003109589 A | 4/2003 |
| JP | 2012084522 A | 4/2012 |
| JP | 2013229339 | 11/2013 |
| KR | 1020170020863 A | 2/2017 |
| WO | WO-2011042742 A1 | 4/2011 |
| WO | WO-2013047024 A1 | 4/2013 |
| WO | WO-2013114094 A1 | 8/2013 |
| WO | WO-2015196092 A1 | 12/2015 |

OTHER PUBLICATIONS

"Chinese Application Serial No. 201580044278.1, Response Filed Jan. 7, 2019 to Office Action dated Aug. 23, 2018", w/English Claims, 11 pgs.
"European Application Serial No. 15809838.4, Extended European Search Report dated Oct. 23, 2017", 11 pgs.
"European Application Serial No. 15809838.4, Office Action dated Feb. 10, 2017", 2 pgs.
"European Application Serial No. 15809838.4, Response Filed Aug. 21, 2017 to Office Action dated Feb. 10, 2017", 14 pgs.
"International Application Serial No. PCT/US2015/036726, International Preliminary Report on Patentability dated Dec. 29, 2016", 9 pgs.
Luo, Wei, et al., "Efficient Fabrication of Nanoporous Si and Si/Ge Enabled by a Heat Scavenger in Magnesfothermic Reactions", *Scientific Reports*, 3:2222, (2013), 1-7.
Wang, Wei, "Monodisperse Porous Silicon Spheres as Anode Materials for Lithium Ion Batteries", *Scientific Reports*, 5: 8781, (2015), 1-6.
Wu, Ping, et al., "Three-Dimensional Interconnected Network of Graphene-Wrapped Porous Silicon Spheres: In Situ Magnesiothermic-Reduction Synthesis and Enhanced Lithium-Storage Capabilities", *ACS Applied Materials & Interfaces*, 6(5), (2014), 3546-3552.
"European Application Serial No. 15809838.4, Response filed May 16, 2018 to Extended European Search Report dated Oct. 23, 2017", 16 pgs.
"European Application Serial No. 15809838.4, Office Action dated Aug. 1, 2018", 3 pgs.
"European Application Serial No. 15809838.4, Response filed Aug. 24, 2018 to Office Action dated Aug. 1, 2018", 6 pgs.
International Application Serial No. PCT/US2015/036726, International Search Report dated Sep. 16, 2015, 3 pgs.
International Application Serial No. PCT/US2015/036726, Written Opinion dated Sep. 16, 2015, 7 pgs.
Chinese Application Serial No. 201580044278.1, Office Action dated Mar. 8, 2019, w/ English translation, 12 pgs.
Chinese Application Serial No. 201580044278.1, Decision of Rejection dated Jul. 8, 2019, w/ English Claims, 13 pgs.
Chinese Application Serial No. 201580044278.1, Response filed Oct. 23, 2019 to Decision of Rejection dated Jul. 8, 2019, w/ English Claims, 10 pgs.
Japanese Application Serial No. 2016-573953, Notification of Reasons for Refusal dated Jul. 23, 2019, w/ English Translation, 9 pgs.
Japanese Application Serial No. 2016-573953, Response filed Nov. 7, 2019 to Notification of Reasons for Refusal dated Jul. 23, 2019, w/ English Claims, 11 pgs.
"Chinese Application Serial No. 201580044278.1, Response filed Apr. 26, 2020 to Notice of Reexamination dated Mar. 12, 2020", w/ English Claims, 11 pgs.
"Japanese Application Serial No. 2016-573953, Notification of Reasons for Rejection dated Jun. 2, 2020", w/ English Translation, 13 pgs.

* cited by examiner

POROUS SILICON NANOSTRUCTURED ELECTRODE AND METHOD

RELATED APPLICATION

This application is a U.S. National Stage Filing under 35 U.S.C. 371 from International Application No. PCT/US2015/036726, filed on Jun. 19, 2015, and published as WO 2015/196092 A1 on Dec. 23, 2015, which claims priority to United States Provisional Patent Application No. 62/015,090, entitled "POROUS SILICON NANOSTRUCTURED ELECTRODE AND METHOD," filed on Jun. 20, 2014, and 62/113,924, entitled "POROUS SILICON NANOSTRUCTURED ELECTRODE AND METHOD," filed on Feb. 9, 2015, each of which is incorporated herein by reference in its entirety.

TECHNICAL FIELD

This invention relates to silicon based material microstructures and methods. In one example, this invention relates to silicon based anodes for lithium ion batteries.

BACKGROUND

Improved batteries, such as lithium ion batteries are desired. One example of a battery structure that can be improved is an anode structure.

DETAILED DESCRIPTION

Figure 1:
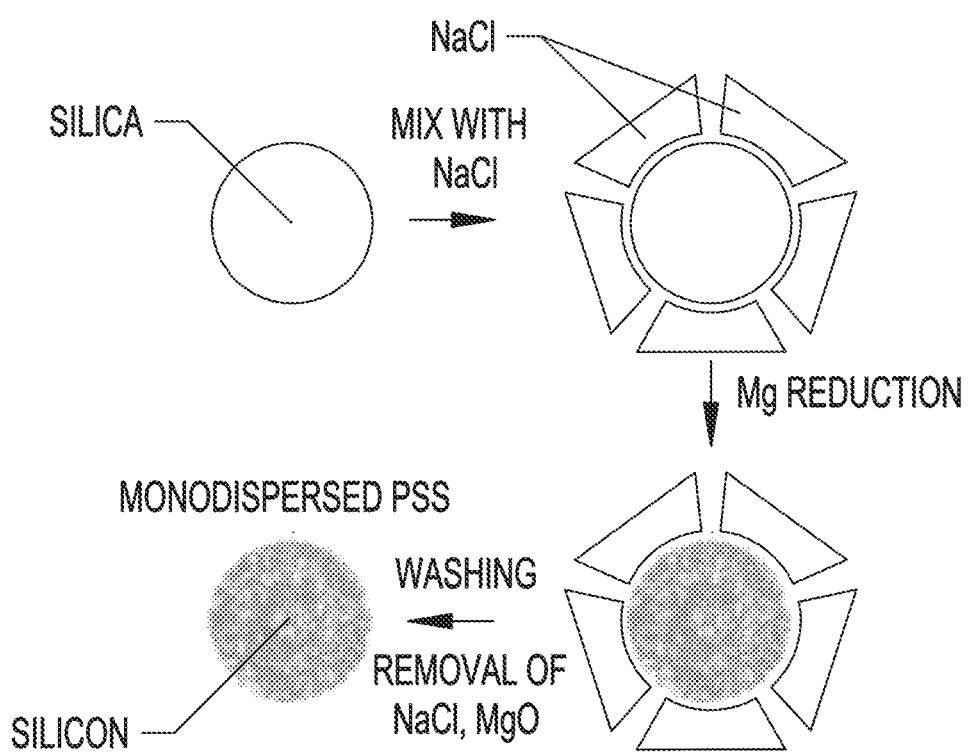
FIG. 1 shows one synthesis process according to an example of the invention.

In the following detailed description, reference is made to the accompanying drawings which form a part hereof; and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, or logical changes, etc. may be made without departing from the scope of the present invention.

Monodisperse porous silicon nanospheres (MPSSs) are synthesized via a simple and scalable hydrolysis process with subsequent surface-protected magnesiothermic reduction. The spherical nature of the MPSSs allows for a homogenous stress-strain distribution within the structure during lithiation and delithiation, which dramatically improves the electrochemical stability. In some examples, carbon nanotubes (CNTs) may be added to enhance the electronic conductivity within the composite electrode structure, which improves the rate and cycling performance of anodes. The Li-ion battery (LIB) anodes based on MPSSs demonstrate a high reversible capacity of 3105 mAh $g^{-1}$. In particular, reversible Li storage capacities above 1500 mAh $g^{-1}$ are maintained after 500 cycles at a high rate of C/2. This innovative approach for synthesizing porous Si-based LIB anode materials by using surface-protected magnesiothermic reduction can be readily applied to other types of $SiO_x$ nano/microstructures.

Faster, lighter, smaller, more powerful and reliable battery devices are needed for the development of portable electronics, electrical vehicles (EVs), and renewable energy resources. Among all types of batteries, LIBs demonstrate better safety performance compared to other types of battery systems including Li metal batteries. Moreover, LIBs possess a balanced large volumetric energy density (Wh $L^{-1}$) and gravimetric energy density (Wh $kg^{-1}$) simultaneously. Compared with the conventionally used anode material, graphite, which has a limited capacity ~372 mAh $g^{-1}$ (due to the stoichiometric limit of Li-ion intercalation in $LiC_6$), silicon is considered to be the candidate anode material for future LIBs due to its high theoretical capacity of 4200 mAh $g^{-1}$ (corresponding to $Li_{22}Si_5$) and low discharge potential. Silicon is one of the rock forming elements and is the second most abundant element in earth's crust. Applying silicon based anodes to LIBs is considered a feasible route to make more powerful batteries with lower weight, smaller volume and lower cost. However, silicon is easily pulverized and has very poor capacity retention due to its large volume change (~300%) during alloying and dealloying with lithium. In addition, the unstable solid electrolyte interface (SEI) layer and poor electron conductivity of silicon hinder the application of Si-based anodes in real LIB devices.

To solve the aforementioned problems, significant research efforts have been focused on optimizing Si-based LIB anodes. Downsizing the dimensions of silicon structures has been proven to be an effective way of avoiding pulverization for both crystalline and amorphous forms of silicon. Extensive research has been conducted on nanostructured silicon such as silicon nanoparticles, silicon nanotubes/nanowires, silicon thin films, and 3D porous structures. In addition, porous doped silicon nanowires and nanoparticles demonstrate stable cycling due to a large electrolyte-accessible surface area, short Li-ion diffusion length, and high electron conductivity. However, the aforementioned porous silicon nanostructures are mostly produced via wet etching of single crystal silicon wafers, chemical doping, or chemical vapor deposition, all of which require very expensive starting materials or high processing costs.

In the following examples, the synthesis of highly monodisperse porous silicon nanospheres (MPSSs) is shown via a simple and scalable hydrolysis process with subsequent surface-protected magnesiothermic reduction. The monodisperse and spherical nature of the MPSSs allows for a homogeneous stress-strain distribution within the structure during lithiation and delithiation, which dramatically improves the electrochemical stability. The high porosity offers a large electrolyte accessible surface area, short Li-ion diffusion length, and void spaces necessary for volume expansion. In one example, LIB anodes based on MPSSs demonstrate a very high reversible capacity of 3105 mAh g$^{-1}$, and minimal capacity fading over 500 cycles at high rate of C/2 (80% capacity retention with 100% Coulombic efficiency). We believe this innovative, high-throughput, and low-cost approach for synthesizing monodisperse and porous silicon-based LIB anode materials by using surface-protected magnesiothermic reduction can be readily applied to other types of SiO$_x$ nanostructures.

Silicon materials are obtained via thermic reduction of silica materials which can be achieved via a few well-studied mechanisms such as carbothermic, calciothermic, aluminothermic, and magnesiothermic reductions. Magnesiothermic reduction has garnered significant attention due to its relatively lower processing temperature ~650° C. compared with >2000° C. (carbothermic). The detailed schematic illustration of the synthesis process of MPSSs is shown in FIG. 1.

Gram-level monodisperse solid silica spheres (SSs) were prepared via a modified Stober method. The diameter of the as-prepared SSs varies from 0.05 μm to 2 μm, and the diameter used in this work is ~200 nm. In order to preserve the diameter and shape of the nanospheres, sodium chloride (NaCl) was introduced as an effective heat scavenger which can halt the reaction temperature rise at 801° C. during fusion and aid in preserving the nanosphere morphology. MSSSs are firstly mechanically milled in an alumina mortar to reduce agglomerations and then ground together with sodium chloride (NaCl, >99.5%, Fisher Scientific) in a 1:10 SiO$_2$:NaCl w/w ratio.

The as-prepared SiO$_2$:NaCl powder is immersed in DI H$_2$O and ultrasonicated for 1 hour and subsequently vigorously stirred at 50° C. for 3 hours. The solution is then dried at 105° C. overnight under vacuum to remove all water. The dried SiO$_2$:NaCl powder is reground briefly to pulverize large NaCl crystals produced during drying and is then mixed with Mg (99.5%, −325 mesh, Sigma-Aldrich) in a 1:0.9 w/w SiO$_2$:Mg ratio.

After vortexing the powder for ample mixing, the powder is loaded into SS 316 Swagelok-type reactors in an Ar-filled VAC Omni-lab glovebox (0.5 ppm H$_2$O, <0.1 ppm O$_2$). The reactors are loaded into an MTI GSL-1200X quartz tube furnace and purged with Ar. The furnace is heated to 700° C. at a rate of 5° C./min, held for 6 hours, and cooled to room temperature. The resulting product is then washed with DI H$_2$O several times to remove NaCl. Unwanted Mg$_2$Si and MgO is removed via etching in 2M HCl overnight with subsequent washing with DI H$_2$O. Unreacted SiO$_2$ is removed by etching in 5% HF for 1 hour. The powder is rinsed several times with DI H$_2$O, dispersed in ethanol, and ultimately dried under vacuum for 4 hours at 105° C.

Figure 2A:
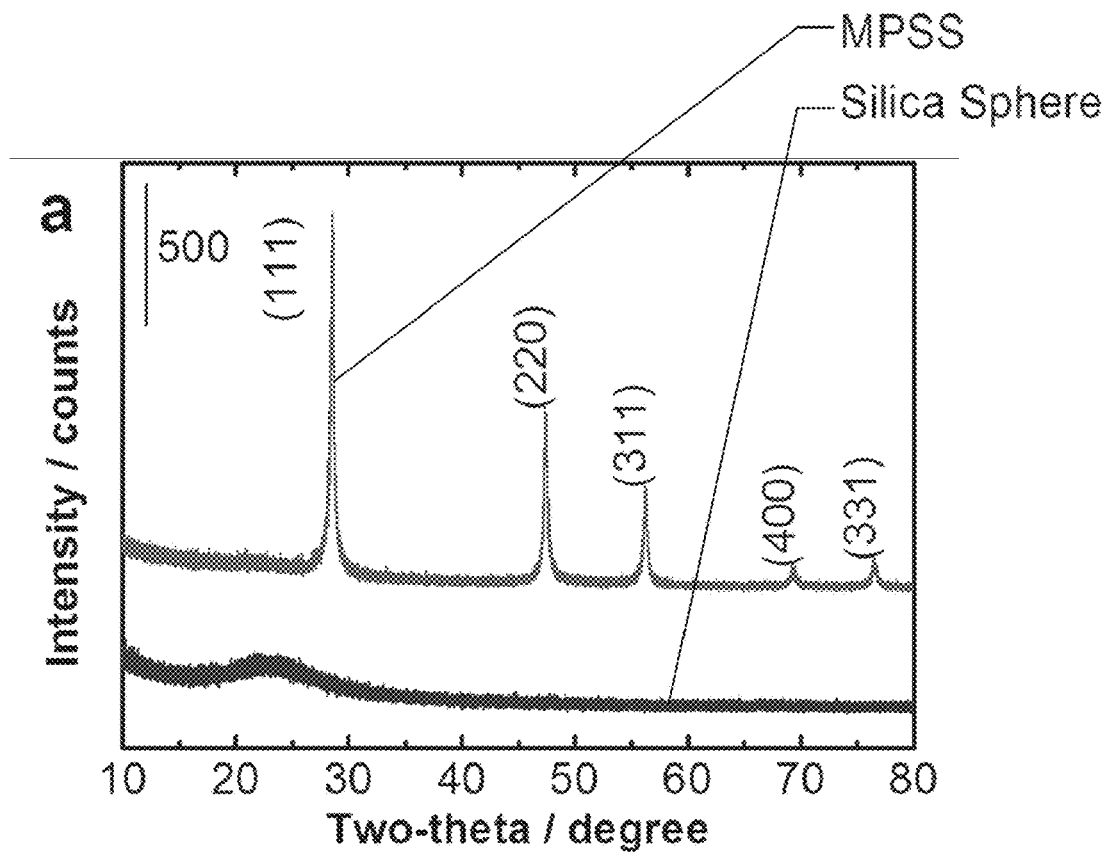
FIG. 2 shows materials characterization results and images according to an example of the invention.
Figure 2B:
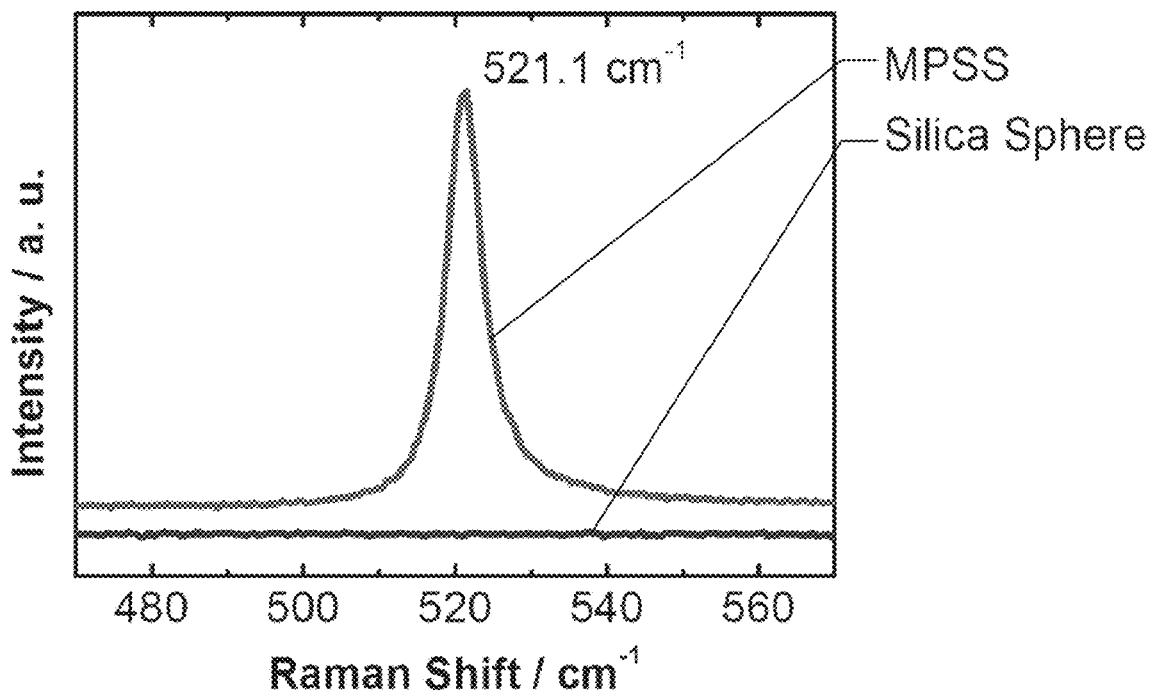

Powder X-ray diffraction (XRD) measurements were performed to characterize the phase and purity of the as-prepared SSs and MPSSs in FIG. 2a. The black spectra and red spectra can be indexed as silica and polycrystalline silicon which are associated with SSs and MPSSs, respectively. The narrow and sharp XRD peaks, without obvious amorphous scattering, exhibited by MPSSs suggest a high degree of crystallinity and they can be indexed to a cubic phase of silicon. Raman spectroscopy was used to further examine the as obtained SSs and MPSSs material as shown in FIG. 2b. The sharp peak at a shift of 521.1 cm$^{-1}$ for the red spectra is in good agreement with Si.

Figure 2C:
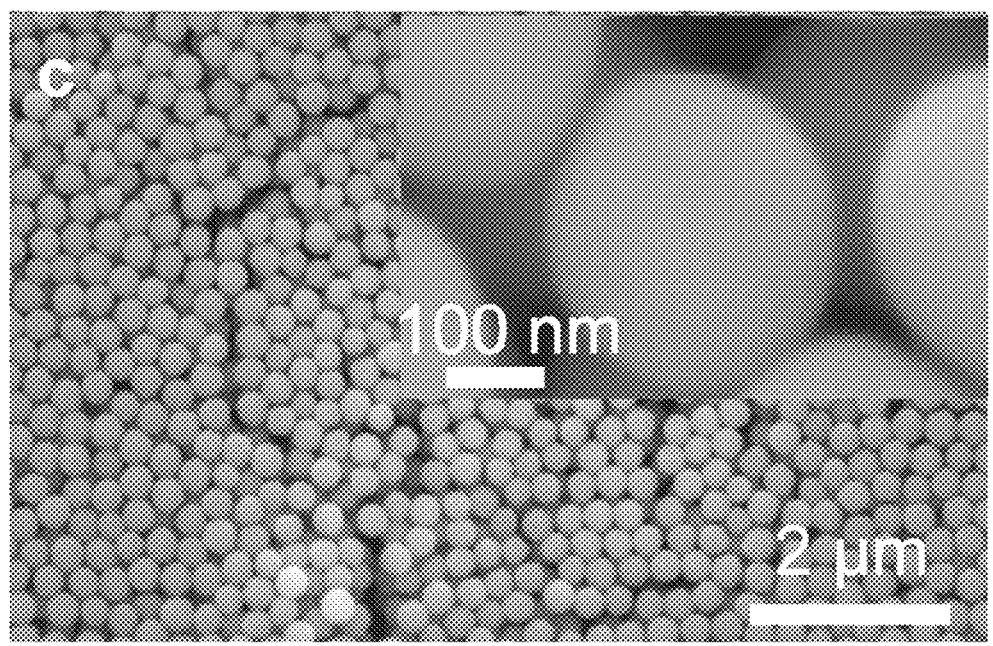
Figure 2D:
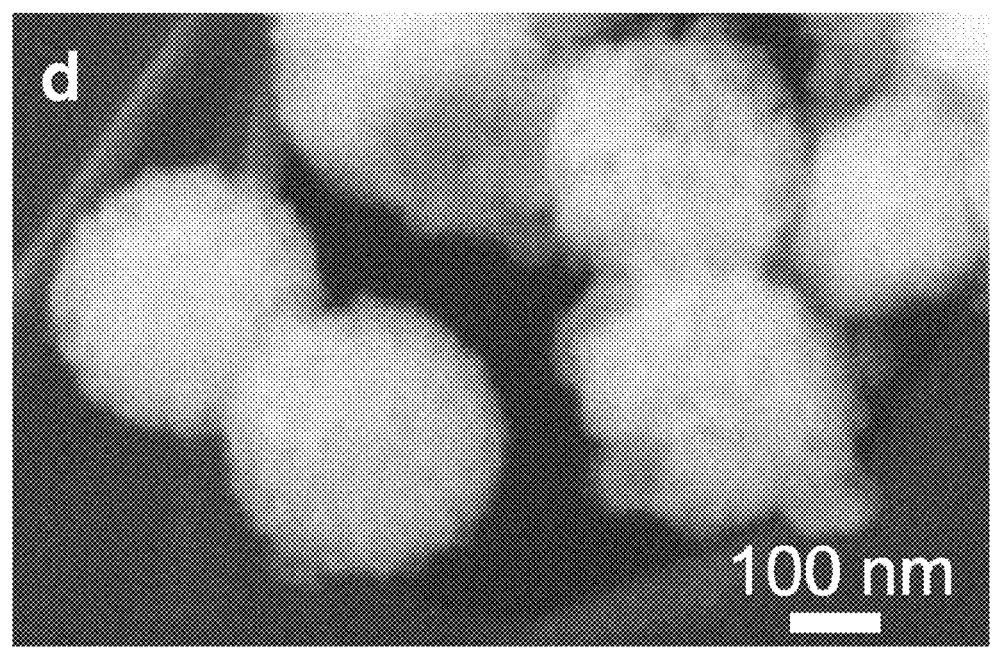

Scanning electron microscopy (SEM) micrographs are shown to illustrate the structural and morphological information of the as-synthesized SSs and MPSSs FIGS. 2c and 2d. Both SSs and MPSSs possess a diameter ~200 nm. Before reduction, SSs assume a monodisperse and solid sphere nature, but after reduction the MPSSs have obtained substantial porosity while maintaining the original spherical morphology.

The morphology of as prepared SSs and MPSSs was further examined in a CM300 transmission electron microscope at an accelerating voltage of 300 kV, as in FIGS. 3a-d. FIGS. 2a and 2b confirm an obvious transition from a monodisperse solid silica sphere to monodisperse porous silicon sphere while preserving the same size and shape after reduction. The MPSS crystals are highly porous with a pore size in the mesopore range. High resolution TEM (HRTEM) confirms the highly crystalline nature of the MPSS sample, with a d-spacing of 0.32 nm, as in FIG. 3d.

Figure 3A:
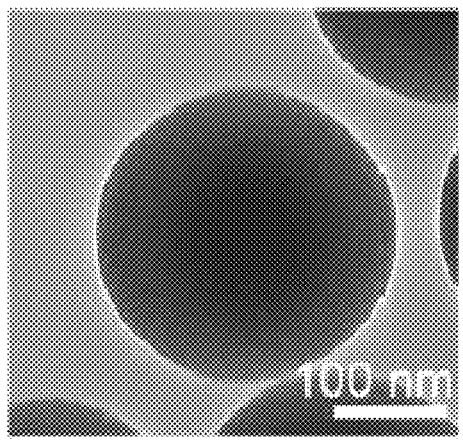
FIG. 3 shows selected TEM images and surface area measurements of materials according to an example of the invention.
Figure 3B:
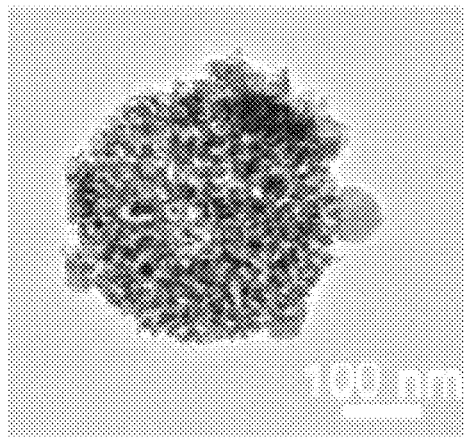
Figure 3C:
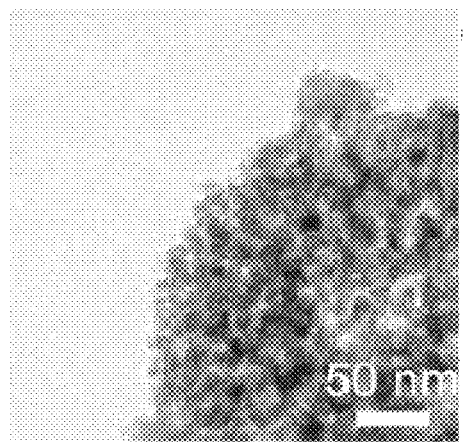
Figure 3D:
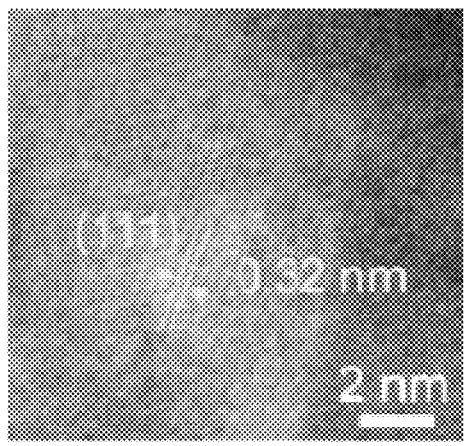
Figure 3E:
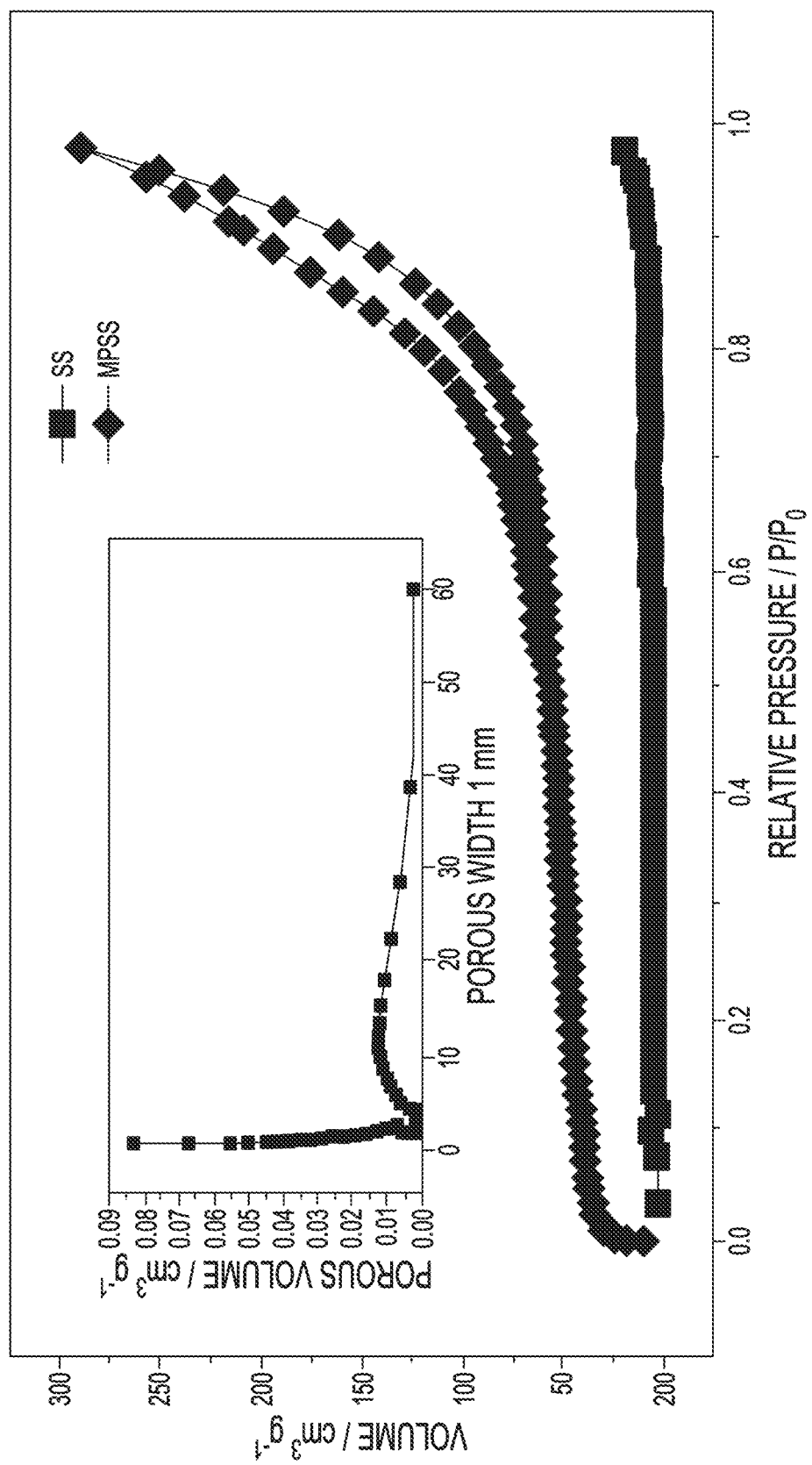

The Langmuir and Brunauer-Emmett-Teller (BET) surface areas of SSs were measured to be 20.07 and 11.89 m$^2$g$^{-1}$, respectively, and the pore distribution suggests the as-prepared SSs have limited surface area and porosity. However, a nearly 20 times enlargement of surface area (Langmuir: 353.22, BET: 214.65 m$^2$g$^{-1}$) is achieved by MPSSs, as in FIG. 3e. The pore distribution suggests the high surface area of MPSSs is due to a combination of mesopores and micropores. Previous works suggest porous silicon with high porosity can maintain its structure during lithiation and delithiation while having relatively low stress compare with bulk form Si which is beneficial for achieving high capacity and long cycling life.

LIB 2032-type half cells were fabricated in an Ar-filled glove box (O$_2$<0.10 ppm, H$_2$O<0.5 ppm) with SS and MPSS electrode as the anode and pure Li metal as the counter electrode. The electrodes were prepared by casting a slurry containing 70% active material (MPSS or SS in this work), 20% conductive additive (carbon black/carbon black with 2 wt. % CNTs), and 10% alginate which has been verified to be an effective binder system for nano-Si and porous Si. 2 wt. % CNTs was added to the electrode slurry to improve the rate performance and to fully extract the real performance of the MPSS materials in this work.

A porous PP membrane (Celgard 3501) was used as the separator. In this example, 1 M LiPF$_6$ dissolved in a 1:1 (v:v) mixture of ethylene carbonate (EC) and dimethyl carbonate (DMC) was used as the electrolyte. Cyclic voltammetry (CV) was performed with a voltage window range of 0.01 to 2.0 V (vs. Li$^+$/Li) at a scan rate of 0.2 mV sec$^{-1}$. Galvanostatic charge-discharge and cycling performance measurements were conducted at a fixed voltage window between 0.01 V and 2.0 V (vs. Li$^+$/Li). Silicon oxide materials have been previously proven to be electrochemically active based on following reactions Eq. 1-3.

$$SiO_x + yLi + ye^- \leftrightarrow Si + Li_yO_x \quad (1)$$

$$SiO_x + yLi \leftrightarrow Li_ySiO_x \quad (2)$$

$$Si + Li + xe^- \leftrightarrow Li_xSi \quad (3)$$

Figure 4A:
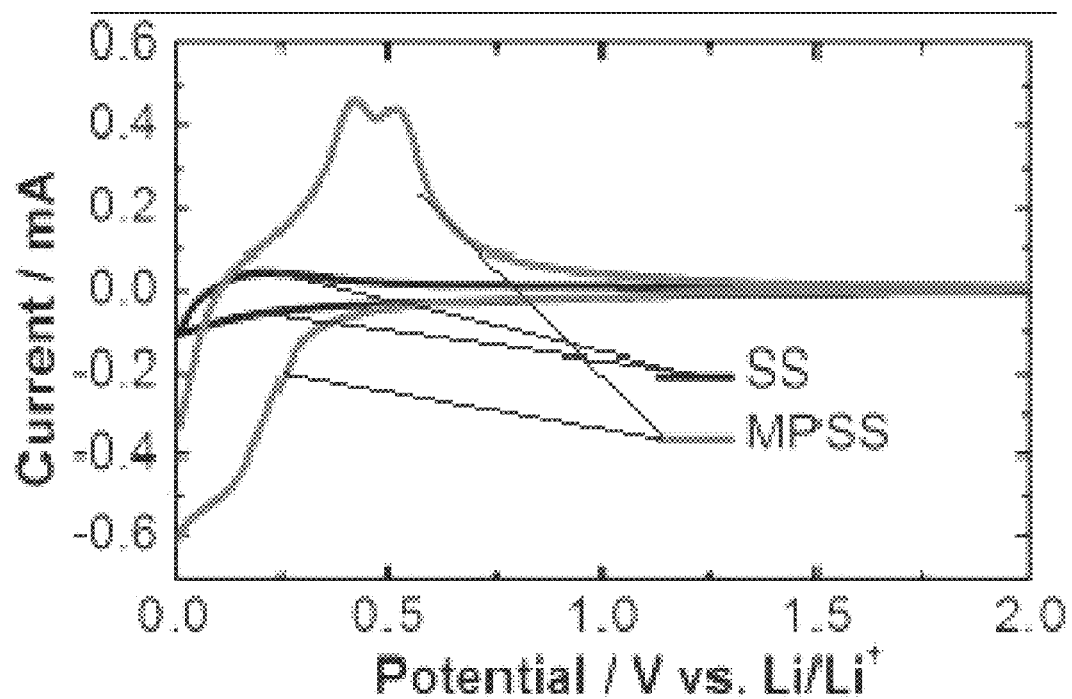
FIG. 4 shows electrical properties of materials according to an example of the invention.
Figure 6:
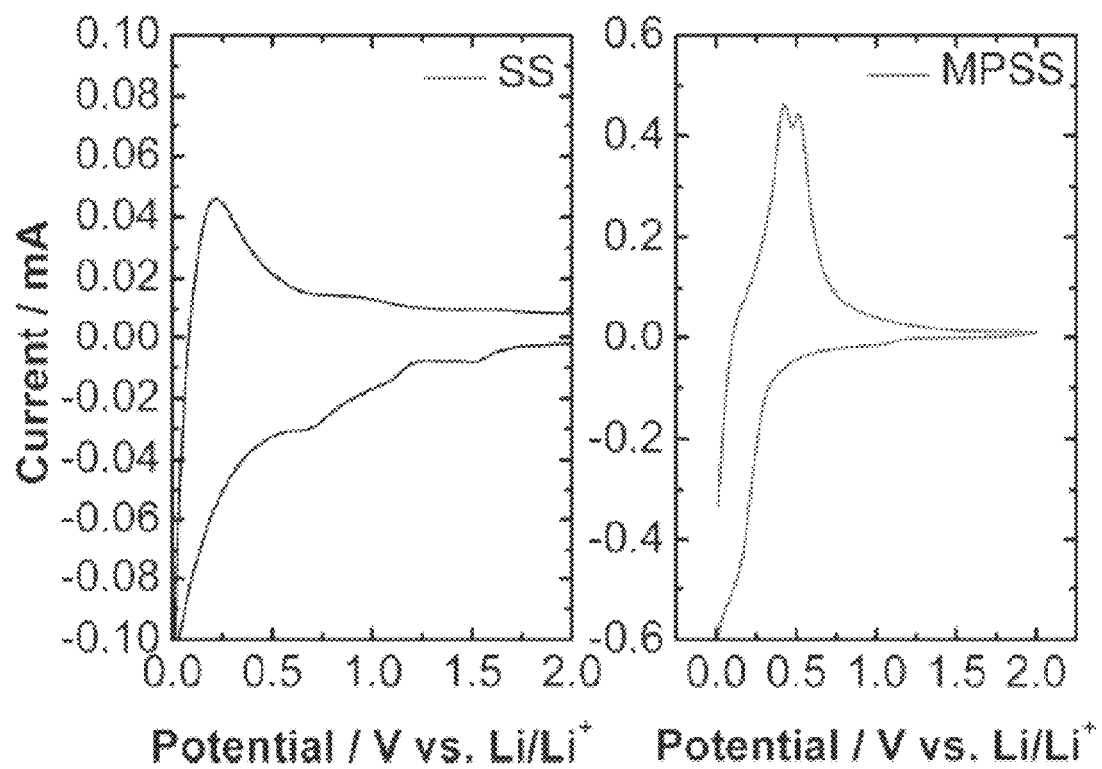
FIG. 6 shows cycling voltammetry data of materials according to an example of the invention.

FIGS. 4a and 6 show the 2nd cycle cyclic voltammogram of the MPSS and SS electrodes at a scan rate of 0.2 mV sec$^{-1}$. CV plot during the charge of the SS electrode shows a noticeable peak <0.33 V which can be attributed to the alloying while two other minor noticeable peaks at the higher potential (0.55 V and 1.4 V) are due to the irreversible reaction between electrode and electrolyte.

The peak in the potential of 0.25 V during the discharge of the SS electrode is due to the dealloying. The current response of SS electrode is much lower compare with MPSS electrode. We believe this can be due to two reasons. (i) Silica has smaller capacity compare with silicon. (ii) the solid nature of SSs suggests the SSs have limited electrolyte accessible surface area compare with MPSS which has been verified by the BET measurement shown in FIG. 3e. The reduction peak of the MPSS electrode observed during charge process is associated with the alloying of Li—Si (<0.33 V) while the two broad peaks during discharge are from delithiation of amorphous lithium silicide (a-Li$_x$Si, x~3.75).

Figure 4B:
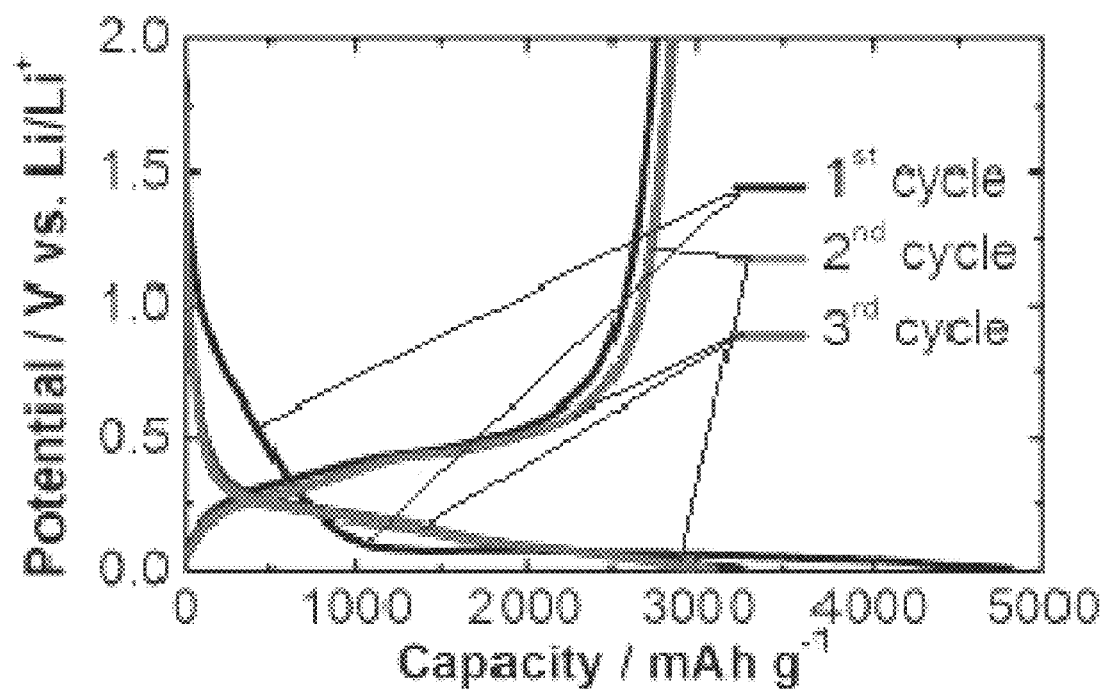
Figure 4C:
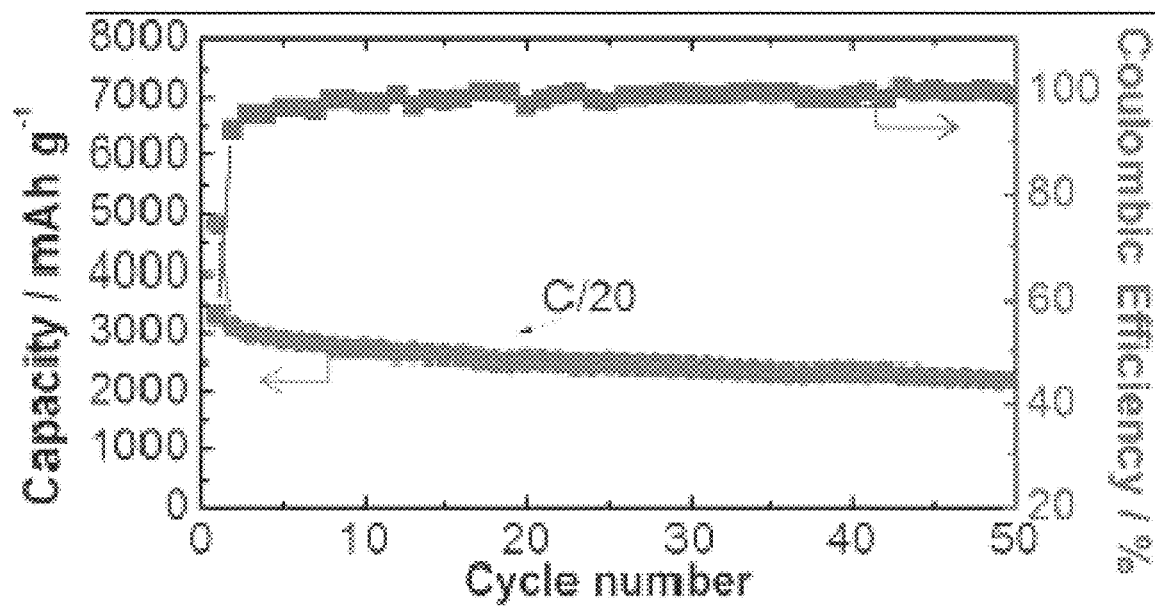

The charge-discharge voltage profiles are in good agreement with the CV measurements. FIG. 4b shows the LIB with a MPSS electrode tested at a current density of C/20 with a voltage range between 0.01 V and 2.0 V, which can be considered as deep charging and discharging for the first three cycles. The MPSS electrode exhibits a reversible discharge capacity of 3105 mAh g$^{-1}$ from the 1$^{st}$ cycle (after 1st discharge). After the 1$^{st}$ charge, the current-potential characteristics become approximately consistent for subsequent cycles. This capacity faded slightly during the following cycles (2$^{nd}$ cycle: 2980 mAh g$^{-1}$, 3$^{rd}$ cycle: 2930 mAh g$^{-1}$). After 50 charge-discharge cycles at relatively low rate of C/20 the capacitance level is still >2200 mAh g$^{-1}$.

The columbic efficiency obtained for all cycles from the second cycle onward is around 100%, suggesting a very good reversibility for MPSS electrodes which is superior to previously reported silica based anodes and comparable with previously published silicon-based anode systems. The irreversible discharge capacity for the first charge is due to the formation of the SEI layer on the surface of MPSS electrodes.

Figure 4D:
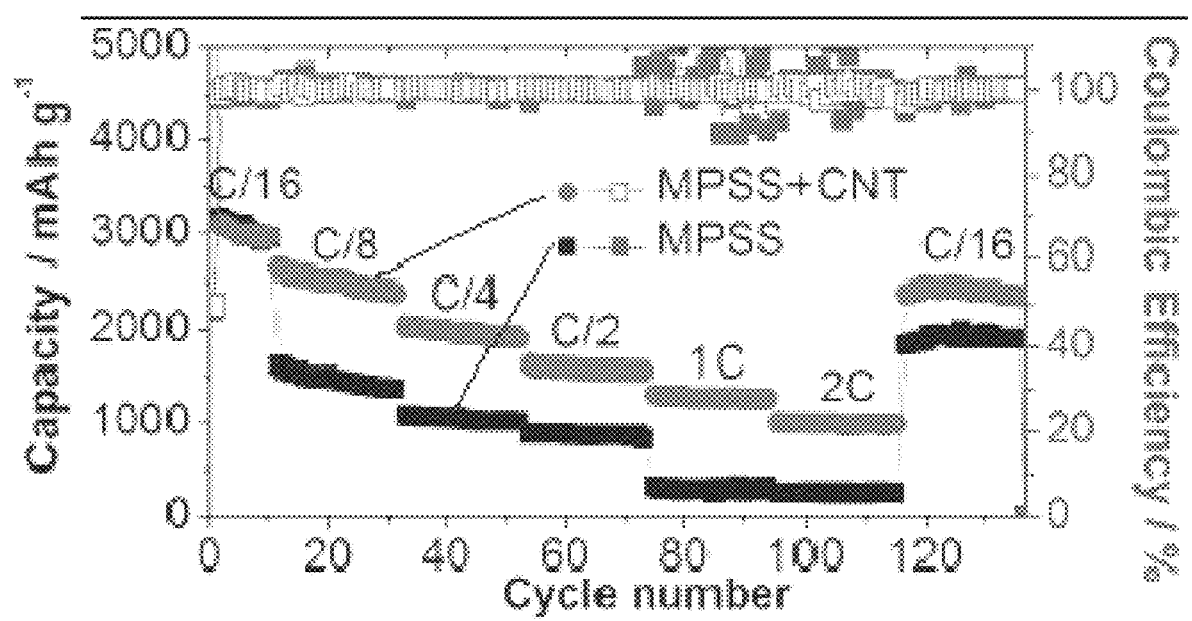

FIG. 4d shows the rate performance of the MPSS anodes with and without a 2 wt. % CNT addition. With the increase of charge-discharge current density from C/20 to 2 C, capacities of the MPSS-CNT anodes decrease from ~3000 mAh g$^{-1}$ to ~1000 mAh g$^1$, while MPSS-carbon black anodes drop to ~260 mAh g$^{-1}$. MPSS anodes without CNTs show very low capacity and poor Columbic efficiency at high rates (1 C or 2 C), as in FIG. 4d. This is due to insufficient charge transfer provided by the micrometer level carbon black within the MPSS anode. Adding a certain amount of CNTs is an effective way to improve the rate performance and cycling stability without changing the active materials ratio, as in FIG. 4d.

Figure 4E:
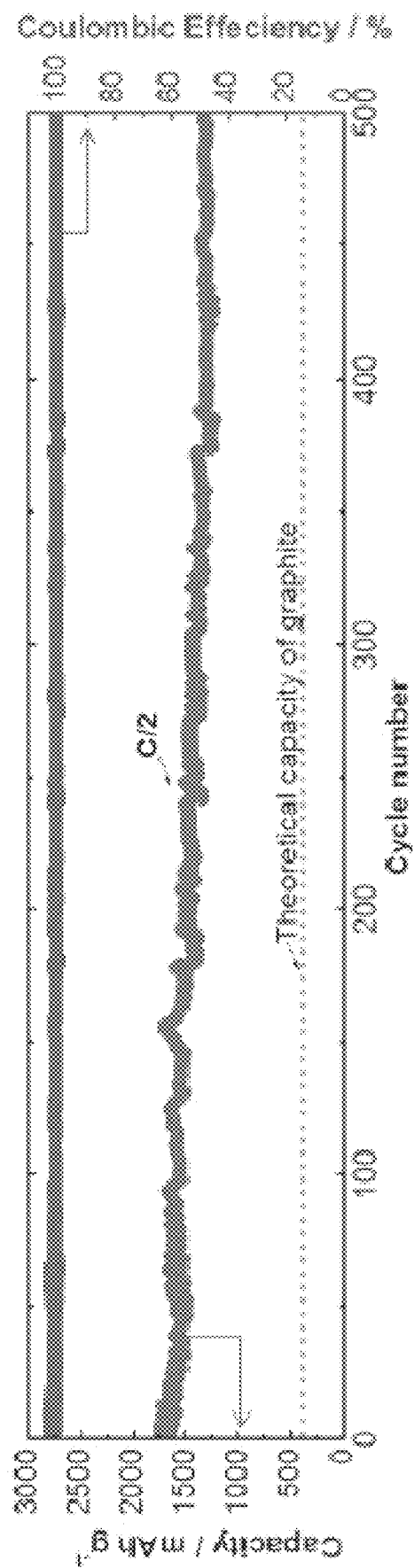

The battery also shows good reversibility after being discharged at higher rate of C/2, seen in FIG. 4e. Excellent capacity retention (>80%) over 500 cycles and nearly 100% Coulombic efficiency suggests MPSS anodes have very good stability and reversibility. It is encouraging to see that a reversible capacity of >1500 mAh g$^{-1}$ is achieved under a current density of C/2 which is much higher when compared with conventionally used graphite-based anodes.

Since the MPSSs used in this example are ~200 nm in diameter, conventionally used micrometer-sized carbon black is not adequate to facilitate charge transfer within the electrode while maintaining a reasonable active material ratio. We believe the addition of CNTs helps to extract the real performance of the MPSSs by improving charge transfer and interface electronic contact resistance. This effectiveness of this hypothesis has been verified by the enhanced rate performance shown in FIG. 4d.

Figure 5C:
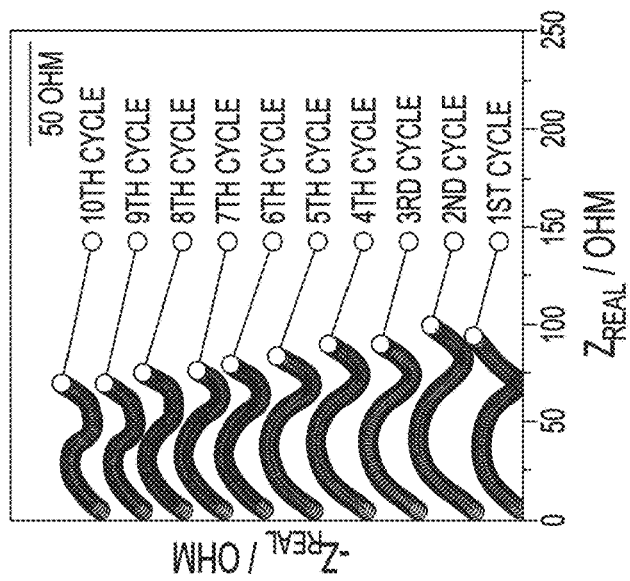
FIG. 5 shows additional electrical properties of materials according to an example of the invention.
Figure 5B:
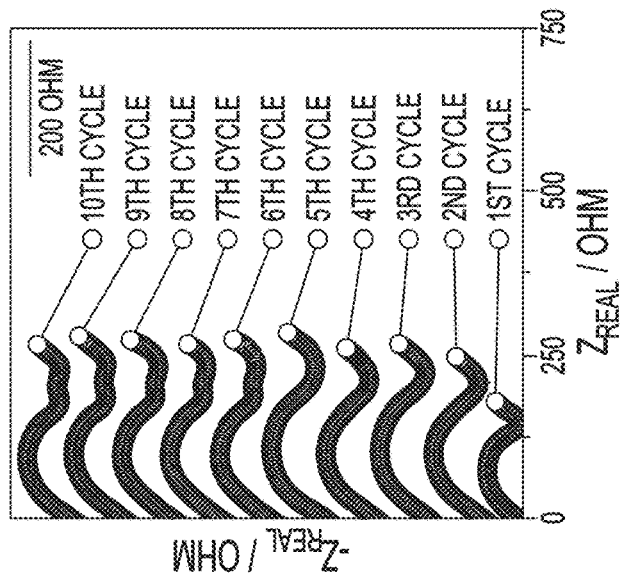
Figure 5A:
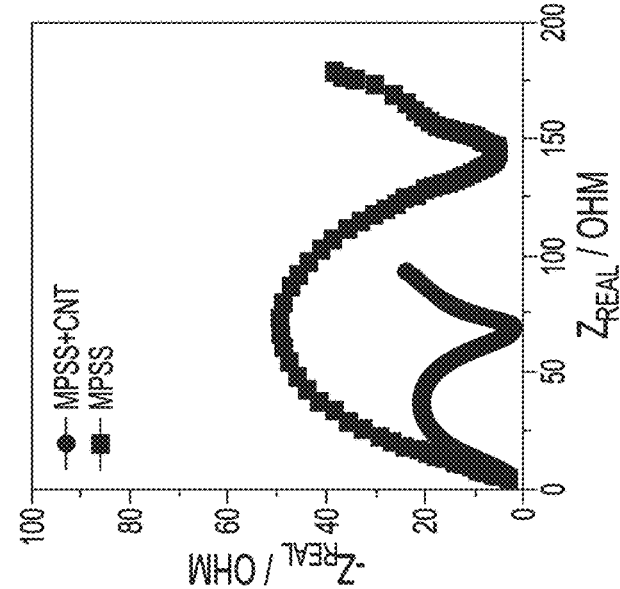

To further verify this hypothesis and study the detailed mechanism, electrochemical impedance spectroscopy (EIS) tests were performed on MPSS based anodes with carbon black only and carbon black together with a 2 wt. % CNT conductive additive. The typical Nyquist plots consist of two semicircles and one linear diffusion drift are shown in FIGS. 5a-c. The high frequency intercept, commonly interpreted as equivalent series resistance (ESR or R$_S$), relates to the ohmic portion of the electrode impedance and includes contributions from the electronic conductivity of the electrodes and ionic conductivity of the electrolyte solution, as well as any electronic contact resistances associated with the cell hardware, current collectors, and electrode materials.

The high frequency depressed semicircles (100 kHz to 200 mHz) are generally associated with interfacial impedance due to SEI formation and the interphase electronic contacts between the current collector and conductive additive/binder system. Each of these arcs can be associated with a separate interfacial phenomenon whose time constant corresponds to the frequency at which the peak of the depressed semicircle is situated. The high-frequency depressed semicircle in this example corresponds to the combined impedance of the SEI film and contact interface among the current collector and active material (CPE$_{sei+int}$ and R$_{sei+int}$). The depressed semicircle in the medium-frequency region contains information about charge-transfer resistance (R$_{CT}$) and W$_O$, the circuit element responsible for the low-frequency (<200 mHz) Warburg impedance tail, which describes diffusion-related phenomena in the device. This includes the diffusion of salt in the electrolyte and diffusion of Li ions into the bulk of the active material. Previous research has shown that interfacial effects of the negative electrode are dominated by kinetics, while the positive electrode exhibits a diffusion-dominated behavior. This explains the relatively shorter tail in the impedance spectrum of anodes in examples of the present invention.

The first cycle EIS plots are shown in FIG. 5a. while the apparent ESR is similar for both systems, it is noteworthy that MPSSs with CNTs demonstrate a slightly smaller value and exhibit approximately half as much interphase electronic contact resistance plus SEI resistance as that of MPSSs with carbon black (demonstrated by the diameter of the first semicircle).

Figure 7A:
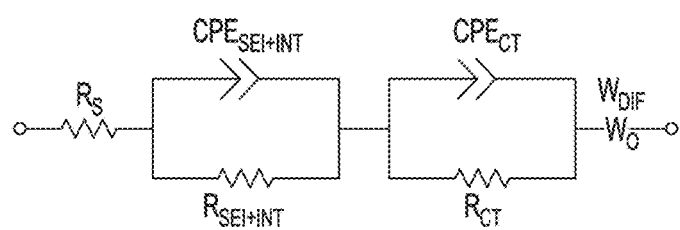
FIG. 7 shows an equivalent circuit, and electrical impedance spectroscopy data of materials according to an example of the invention.

To better understand the EIS evolution and capacity fading mechanism of these two systems, EIS measurements were performed over 10 consecutive cycles for both systems, as in FIGS. 5b and 5c. Based on the behavior of the Nyquist spectra and previous studies, the equivalent circuit for our MPSS-based electrode system is shown in FIG. 7a.

Figure 5F:
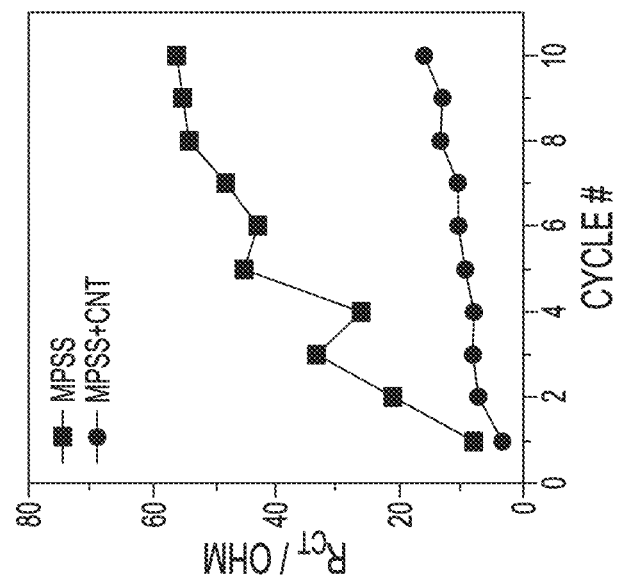
Figure 5E:
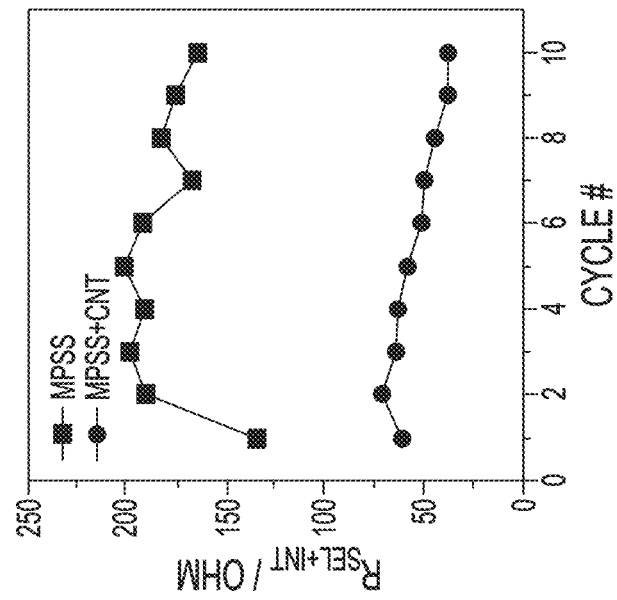
Figure 5D:
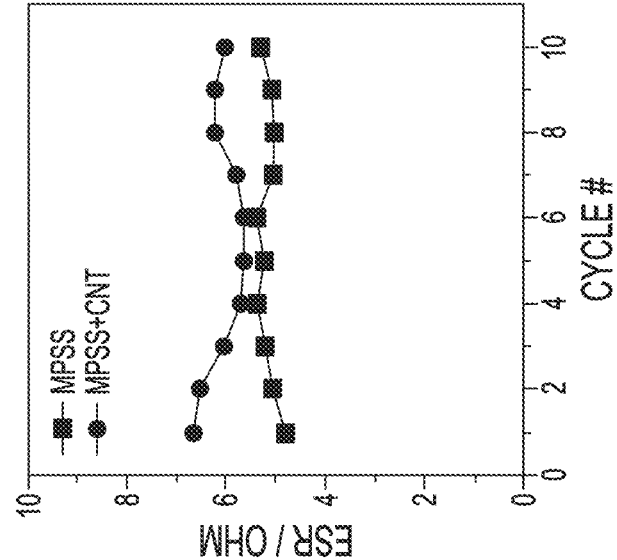
Figure 7B:
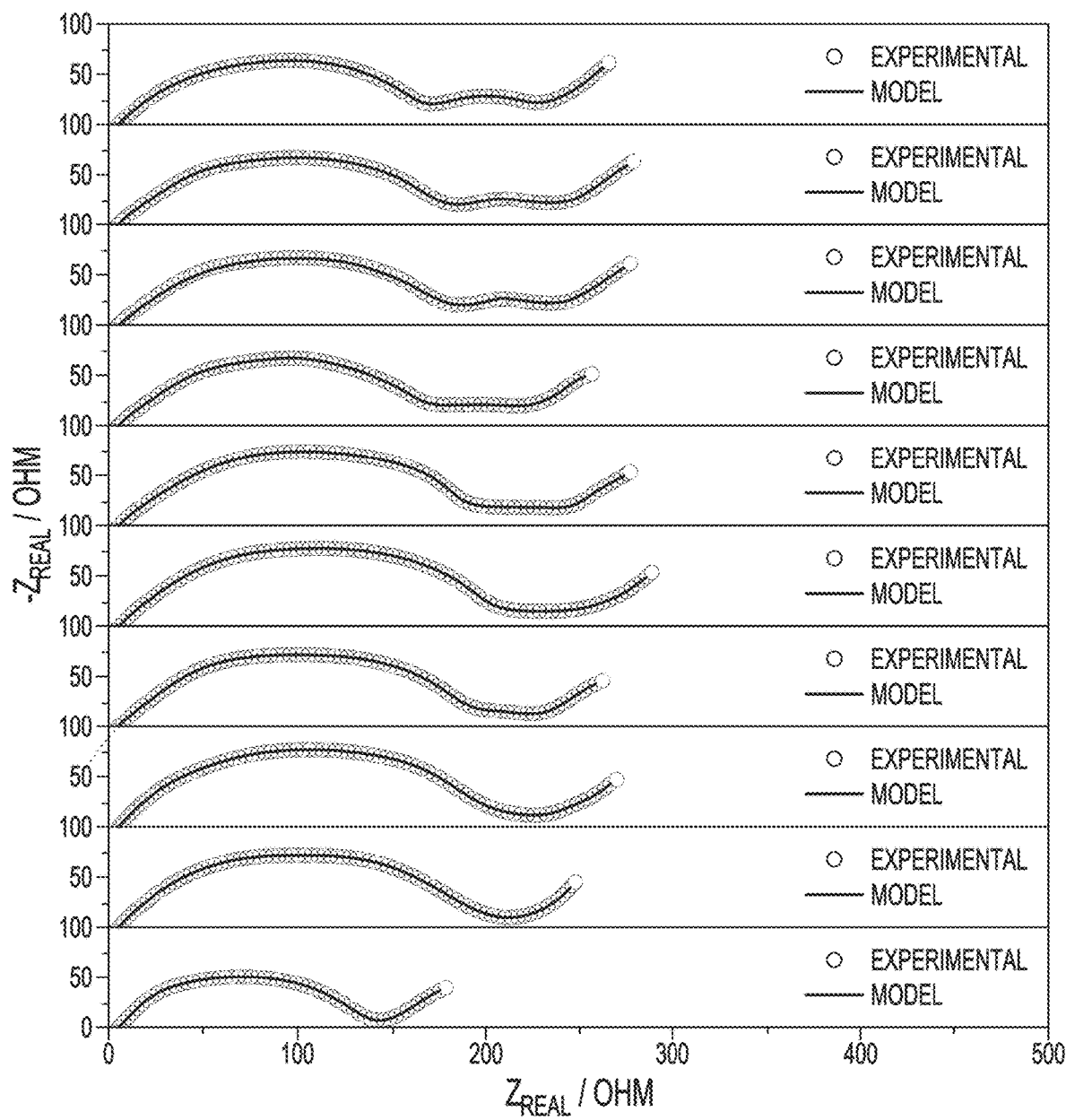
Figure 7C:
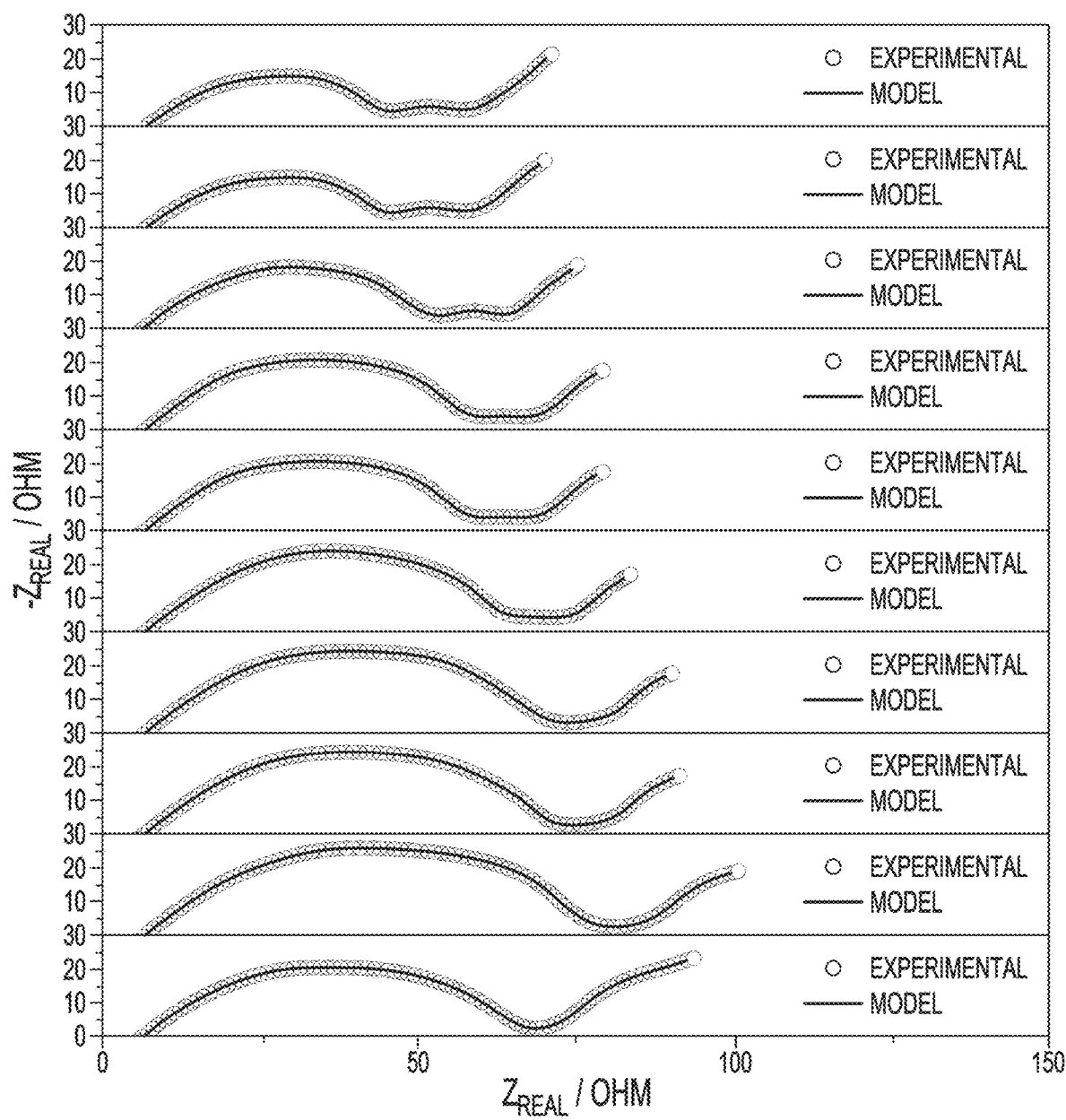

The fitted impedance parameters including ESR, R$_{sei+int}$, and the Rct at different cycles are summarized in FIGS. 5d, 5e and 5f and experimental and fitted EIS plots are summarized in FIG. 7b. Both systems exhibited low and stable ESR values with a small range of fluctuations (5.5±1 ohm) in the first 10 cycles. The R$_{sei+int}$ for both systems increases in the first two cycles and it tends to stabilize and then gradually decrease afterwards. The increase in the second cycle can be attributed to the continuous formation of SEI layer.

Since the electrodes are pressed by a spring in coin cell configuration, the decrease of R$_{sei+int}$ may due to the irreversible electrode volume during cycling which results in gradually increasing of the pressure on the electrodes. Therefore, the interphase electronic contact resistance was slightly improved.

It is worth noting that the MPSS electrodes with 2 w.t % CNT additive demonstrate ~60% lower R$_{sei+int}$ compared with MPSS electrodes with carbon black only, which further confirms the effectiveness of using CNTs as conductive additive for nanosilicon materials. R$_{ct}$ values for MPSS electrodes with carbon black only increase constantly (over 10 times) over the first 10 cycles while the R$_{ct}$ of electrodes based on MPSS with 2 wt. % CNTs tends to stabilize at ~10 ohm.

Since the charge transfer reaction primarily happens on the surface of the MPSSs, the electronic contact between MPSSs and conductive additives/binders has a great impact on the charge transfer reaction. Comparing the electrodes with CNT to without CNT additive, the addition of CNTs provides an interpenetrating conductive network within the composite electrode which facilitates charge transfer and minimizes the degradation of the electronic contact between MPSSs and conductive additives/binder. The low frequency tails, representing diffusion impedance, are shorter for the system with CNTs thereby implying faster and more facile diffusion of Li-ions into the electrode.

In summary, we have reported the synthesis of highly monodisperse porous silicon spheres (MPSSs) via a facile hydrolysis process with subsequent surface-protected magnesiothermic reduction. The spherical nature of the monodisperse porous nanospheres permits a homogeneous stress-strain distribution within the structure during lithiation and delithiation. We have also shown the Li-ion battery anodes based on MPSSs demonstrate a high reversible capacity of ~3105 mAh $g^{-1}$, superior rate performance, and excellent cycling stability.

EXAMPLES

Materials Synthesis

Monodisperse solid silica spheres (SS) are prepared via the modified Stober method. Firstly, 9 ml $NH_3H_2O$, 16.25 ml ethanol, and 24.75 ml DI water are premixed under room temperature while stirring at 1100 rpm to form a uniform mixture solution A. Next, solution B is prepared by adding 4.5 ml TEOS to 45.5 ml ethanol. Solution B is added into the mixture solution A while stirring at 450 rpm and the final mixture is kept stirring for 2 hours. The final products are washed with a mixture of water and ethanol repeatedly and collected by centrifuging and vacuum drying.

$SiO_2$ nanosphere powder is mixed with NaCl (>99.5%, Fisher Scientific) in a 1:10 w/w ratio and milled in an alumina mortar. The $SiO_2$:NaCl powder is immersed in DI $H_2O$ and ultrasonicated for 1 hour and subsequently vigorously stirred at 50° C. for 3 hours. The solution is dried at 90° C. under vacuum to remove all water. The resulting $SiO_2$:NaCl powder is then mixed with Mg (99.5%, −325 mesh, Sigma-Aldrich) in a 1:0.9 w/w $SiO_2$:Mg ratio. After vortexing the powder for ample mixing, the powder is loaded into SS 316 Swagelok-type reactors in an argon-filled VAC Omni-lab glovebox (0.5 ppm $H_2O$, <0.1 ppm $O_2$). The reactors are loaded into an MTI GSL-1200X quartz tube furnace and purged with argon. The furnace is heated to 700° C. at a rate of 5° C./min, held for 6 hours, and cooled to room temperature. The resulting product is then washed with DI $H_2O$ several times to remove NaCl. Unwanted $Mg_2Si$ and MgO is removed via etching in concentrated HCl overnight with subsequent washing with DI $H_2O$. Unreacted $SiO_2$ is removed by etching in 5% HF for 1 hour. The powder is rinsed several times with DI $H_2O$, dispersed in ethanol, and ultimately dried under vacuum for 4 hours at 100° C.

Materials Characterization

The surface morphology is investigated using optical microscopy, scanning electron microscopy (SEM; leo-supra, 1550) with an X-ray energy-dispersive spectroscopy (EDS), and transmission electron microscopy (TEM; Philips, CM300) with a $LaB_6$ cathode operated at 300 KV. For TEM imaging, the sample is ultrasonically dispersed in ethanol for 1 hr and then diluted and dropped onto a TEM grid. A Renishaw DXR Raman spectroscopy system with a 532 nm laser (8 mW excitation power, 100× objective lens) source is used to characterize SS and MPSS.

Fabrication and Testing of Lithium Ion Battery (LIB)

The electrodes were prepared by casting a slurry containing 70% active material (SS, MPSS, or C-MPSS in this work), 20% conductive additive (carbon black), and 10% sodium alginate binder. The per-area mass loading for the as-prepared electrodes were 0.5-1.0 $mgcm^{-2}$. A button-type (CR 2032) two-electrode half-cell configuration was used for the electrochemical measurements. The LIBs were assembled in an Ar filled glovebox with moisture and oxygen level below 1 ppm. Pure lithium metal was used as the counter electrode of the LIB. A porous membrane (Celgard 3501) was used as the separator. In this work, 1 M $LiPF_6$ dissolved in a 1:1 (v:v) mixture of ethylene carbonate (EC) and dimethyl carbonate (DMC) was used as the electrolyte. Cyclic voltammetry scans were performed with a voltage window range of 0.01 to 2.0 V (vs. $Li^+$/Li) at a scan rate of 0.2 mV $sec^{-1}$. Galvanostatic charge-discharge and cycling performance measurements were conducted at a fixed voltage window between 0.01 V and 2.0 V (vs. $Li^+$/Li). The C rate was defined based on the theoretical Li storage capacity of Si which is ~3579 mAh $g^{-1}$ for $Li_{15}Si_4$ at room temperature.[12,35] Electrochemical impedance spectroscopy (EIS) was conducted to evaluate the charge transfer performance of the LIBs. Potentiostatic EIS measurements were performed between 0.01 Hz and 1 MHz with an amplitude of 10 mV.

Figure 8:
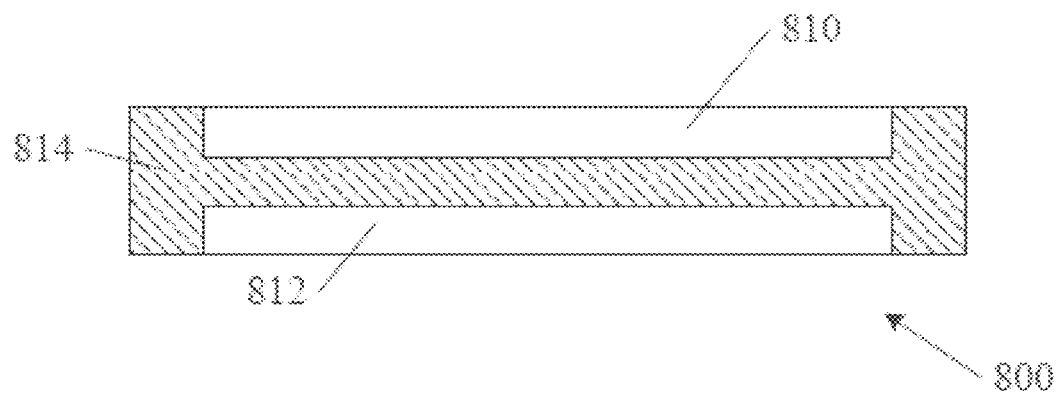
FIG. 8 shows a battery according to an example of the invention.

FIG. 8 shows an example of a battery 800 according to an embodiment of the invention. The battery 800 is shown including an anode 810 and a cathode 812. An electrolyte 814 is shown between the anode 810 and the cathode 812. In one example, the battery 800 is a lithium-ion battery. In one example, the anode 810 is formed from a porous silicon sphere as described in examples above. In one example, although the invention is not so limited, the battery 800 is formed to comply with a 2032 coin type form factor.

Figure 9:
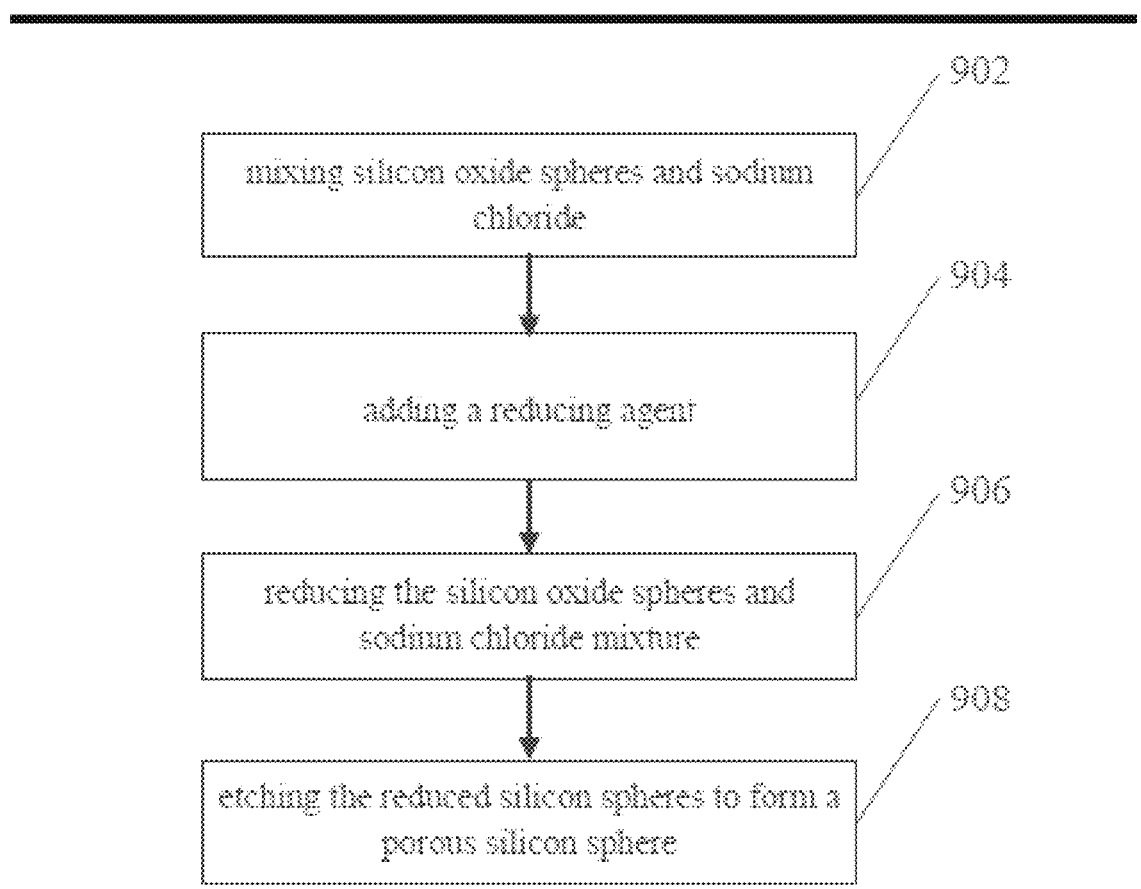
FIG. 9 shows a method of forming a material according to an example of the invention.

FIG. 9 shows an example method of forming according to an embodiment of the invention. In operation 902, silicon oxide spheres and sodium chloride are mixed. In operation 904, a reducing agent is added. In operation 906, the silicon oxide spheres and sodium chloride mixture are reduced. In operation 908, the reduced silicon spheres are etched to form a porous silicon sphere.

To better illustrate the method and device disclosed herein, a non-limiting list of embodiments is provided here:

Example 1 includes a battery, including a first electrode, including a number of porous silicon spheres, a second electrode, and an electrolyte in contact with both the first electrode and the second electrode.

Example 2 includes the battery of example 1, wherein the first electrode further includes carbon nanotubes mixed with the porous silicon spheres.

Example 3 includes the battery of any one of examples 1-2, wherein the first electrode further includes approximately 2% by weight carbon nanotubes in carbon black mixed with the porous silicon spheres.

Example 4 includes the battery of any one of examples 1-3, wherein the second electrode includes lithium metal.

Example 5 includes the battery of any one of examples 1-4, wherein the electrolyte includes a mixture of $LiPF_6$, ethylene carbonate and dimethyl carbonate.

Example 6 includes the battery of any one of examples 1-5, wherein the porous silicon spheres are between approximately 0.05 micrometer and 2.00 micrometer in diameter.

Example 7 includes the battery of any one of examples 1-6, wherein the porous silicon spheres are approximately 200 nanometers in diameter.

Example 8 includes the battery of any one of examples 1-7, wherein the number of porous silicon spheres includes substantially crystalline porous silicon spheres.

Example 9 includes the battery of any one of examples 1-8, wherein the number of porous silicon spheres include a surface area of greater than approximately 200 $m^2g^{-1}$.

Example 10 includes a method of forming a battery electrode, that includes mixing silicon oxide spheres and sodium chloride, adding a reducing agent, reducing the silicon oxide spheres and sodium chloride mixture to form silicon spheres, and etching the reduced silicon spheres to form a porous silicon sphere.

Example 11 includes the method of example 10, wherein the silicon oxide spheres are between approximately 0.05 micrometer and 2.00 micrometer in diameter.

Example 12 includes the method of any one of examples 10-11, wherein the silicon oxide spheres are approximately 200 nanometers in diameter.

Example 13 includes the method of any one of examples 10-12, wherein the silicon oxide spheres are prepared using the Stober method.

Example 14 includes the method of any one of examples 10-13, wherein reducing the silicon oxide spheres and sodium chloride mixture includes magnesiothermically reducing the silicon oxide spheres and sodium chloride mixture.

Example 15 includes the method of any one of examples 10-14, wherein mixing silicon oxide spheres and sodium chloride includes mixing silicon oxide spheres and sodium chloride in a ratio of approximately 1:10 silicon oxide to sodium chloride by weight.

Example 16 includes the method of any one of examples 10-15, further including mixing magnesium powder with the silicon oxide spheres and sodium chloride in a ratio of approximately 1:0.9 silicon oxide to magnesium by weight.

Example 17 includes a method of forming a battery electrode, that includes mixing silicon oxide nanoparticles and sodium chloride, adding a reducing agent, reducing the silicon oxide nanoparticles and sodium chloride mixture to form silicon nanoparticles in substantially the same geometry as the silicon oxide nanoparticles, and etching the silicon nanoparticles to form porous silicon nanoparticles.

Example 18 includes the method of example 17, wherein mixing silicon oxide nanoparticles includes mixing silicon oxide nanospheres.

While a number of advantages of embodiments described herein are listed above, the list is not exhaustive. Other advantages of embodiments described above will be apparent to one of ordinary skill in the art, having read the present disclosure. Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A battery, comprising:
   a first electrode, including a number of monodisperse porous silicon spheres, wherein the first electrode includes 20% conductive additive mixed with the monodisperse porous silicon spheres, the conductive additive includes 2% by weight carbon nanotubes in carbon black;
   a second electrode; and
   an electrolyte in contact with both the first electrode and the second electrode.

2. The battery of claim 1, wherein the second electrode includes lithium metal.

3. The battery of claim 1, wherein the electrolyte includes a mixture of $LiPF_6$, ethylene carbonate and dimethyl carbonate.

4. The battery of claim 1, wherein the monodisperse porous silicon spheres are between approximately 0.05 micrometer and 2.00 micrometer in diameter.

5. The battery of claim 1, wherein the monodisperse porous silicon spheres are approximately 200 nanometers in diameter.

6. The battery of claim 1, wherein the number of monodisperse porous silicon spheres includes substantially crystalline monodisperse porous silicon spheres.

7. The battery of claim 1, wherein the number of monodisperse porous silicon spheres include a surface area of greater than approximately 200 $m^2g^{-1}$.

* * * * *